Aug. 18, 1942.    L. A. WILKIE    2,293,481
WELDING APPARATUS
Filed Oct. 28, 1939    9 Sheets-Sheet 4

Inventor:
Leighton A. Wilkie
By Mann, Brown &c.
Attys.

Aug. 18, 1942.                L. A. WILKIE                2,293,481
                           WELDING APPARATUS
                         Filed Oct. 28, 1939            9 Sheets-Sheet 8

Fig. 13

INVENTOR.
Leighton A. Wilkie
BY Mann, Brown &
                    ATTYS

Aug. 18, 1942.   L. A. WILKIE   2,293,481
WELDING APPARATUS
Filed Oct. 28, 1939   9 Sheets-Sheet 9

INVENTOR.
Leighton A. Wilkie
BY Mann, Brown & Cox
ATTYS.

Patented Aug. 18, 1942

2,293,481

UNITED STATES PATENT OFFICE 2,293,481

WELDING APPARATUS

Leighton A. Wilkie, Libertyville, Ill.

Application October 28, 1939, Serial No. 301,819

9 Claims. (Cl. 219—4)

This invention relates to welding devices and more particularly to devices for welding band saws and the like.

One of the objects of the invention is the provision of a new and improved welding mechanism that is adapted to be employed to weld the severed ends of a band saw in a minimum of time and labor.

Another object of the invention is the provision of a new and improved welding device having novel means for automatically opening the welding circuit when the welding operation is completed.

A further object of the invention is the provision of a welding mechanism provided with new and improved means for varying the welding current characteristics to conform to requirements for welding saw bands of different widths.

A still further object of the invention is the provision of a new and improved welding device that is readily adjustable for welding saw bands of various widths and for tempering the welded portions of the bands.

Another object of the invention is the provision of a new and improved combined welding and annealing mechanism that is simple in construction; efficient in operation; that is adapted to be mounted on a single panel which may be attached to the frame structure of a band saw; and that may be readily and easily adjusted to meet the varying conditions to which said mechanism may be subjected.

Other and further objects and advantages of the invention will appear from the following description, taken in connection with the accompanying drawings, in which—

In the manufacture and use of band saws, and especially those of the metal working type, it is desirable that means be provided whereby the bands may be introduced into internal openings for interior work. Since these bands are endless and are of thin flexible metallic material, the only practical method, or at least most economical one of inserting them in interior openings, is to sever the band, insert it through the openings, and then weld the ends together. The provision of a device for welding and tempering that is simple and effective is highly desirable. Sometimes the work requires internal sawing for a few minutes only and then external work. Where the shop has a limited number of machines, an enormous amount of time may be saved by the provision of a welder that may be employed by the operator of the machine without the necessity of removing the band to another portion of the shop for the welding and tempering operation.

The present invention in welding devices is adapted to be attached to the saw frame as a part of the unitary structure.

Referring now to the drawings, the reference character 9 designates a metal sawing machine such, for instance, like that shown in my patent, No. 2,180,079, November 14, 1939. Since the details of the combined sawing and filing apparatus constitute no part of the present invention, it is not thought necessary to illustrate or describe the same in detail.

The reference character 10 designates the panel carrying the welding mechanism and which in turn is mounted on the side of the apparatus 9 and secured by the fastening means 11. Mounted on the face of the panel and accessible from in front thereof are a dial 12 for the rheostat 12b, a dial 13 for the tap switch or voltage control 13b, a two-way switch 14 for the current control, the fixed welding or terminal block 15, the movable terminal block 16, and the electric lamp 17. The lamp 17 is mounted in a suitable shield 18 open at its lower side and within which is mounted the lamp or bulb 17 for lighting the face of the dial. A switch lever for controlling the operation of the welding mechanism is mounted on the panel and shown at 21.

Figure 2:
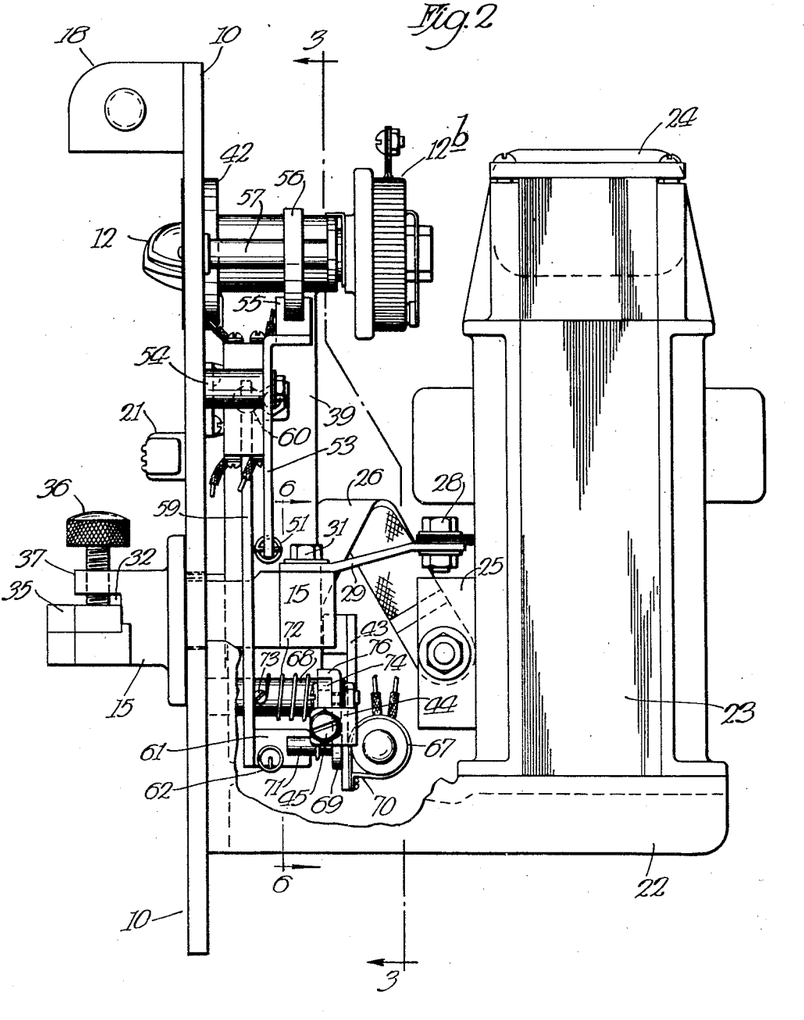
Fig. 2 is a side elevation of the panel, with parts broken away.
Figure 3:
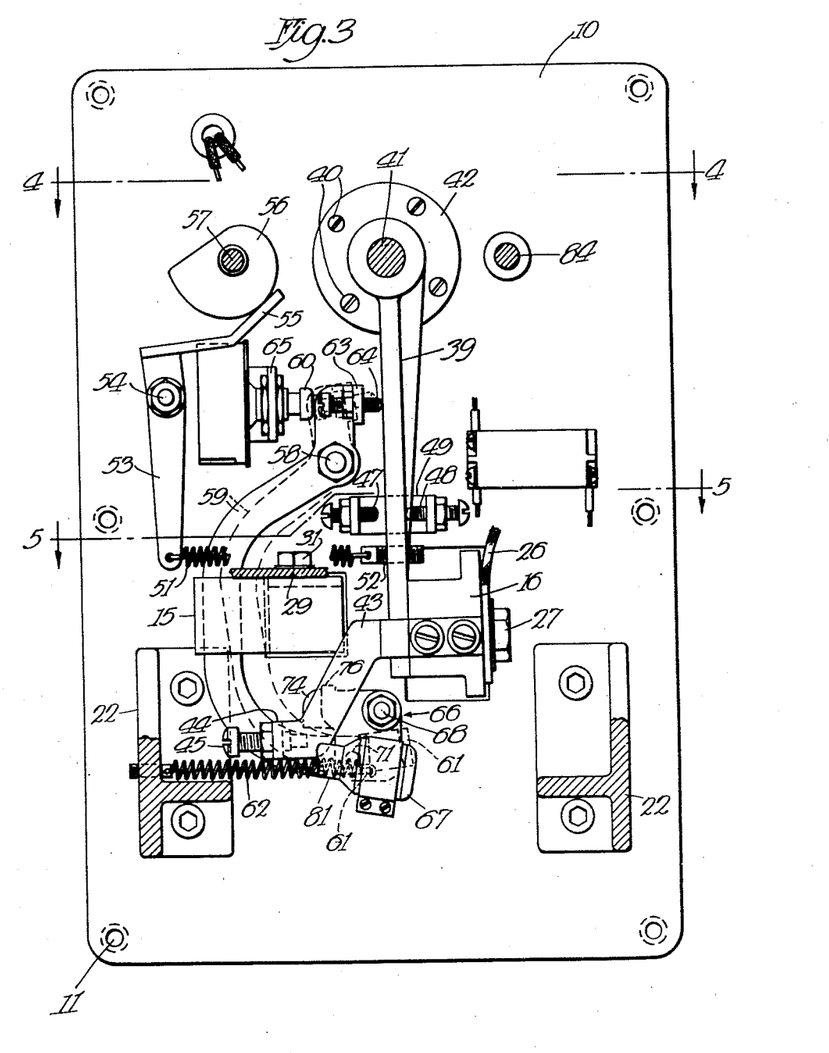
Fig. 3 is a section on the line 3—3 of Fig. 2.

Rigidly attached to the panel and extending rearwardly therefrom are supports 22 on which is mounted a transformer 23 of the multiple plate type, Figs. 2 and 3. Mounted on the transformer 23 and constituting an extension thereof is what may be termed a reactance or choke coil 24. Attached to one pole 25 of the secondary of the transformer 23 is a flexible conductor such as the copper strip 26, Fig. 2, the opposite end of which is connected to the movable welding terminal block 16 by any suitable means, such as the bolt or screw 27, Figs. 2 and 3. The other terminal 28 of the secondary of the transformer, Fig. 2, is connected as by means of the fixed conductor 29 to the stationary terminal 15, as by means of the bolt or screw 31.

Figure 1:
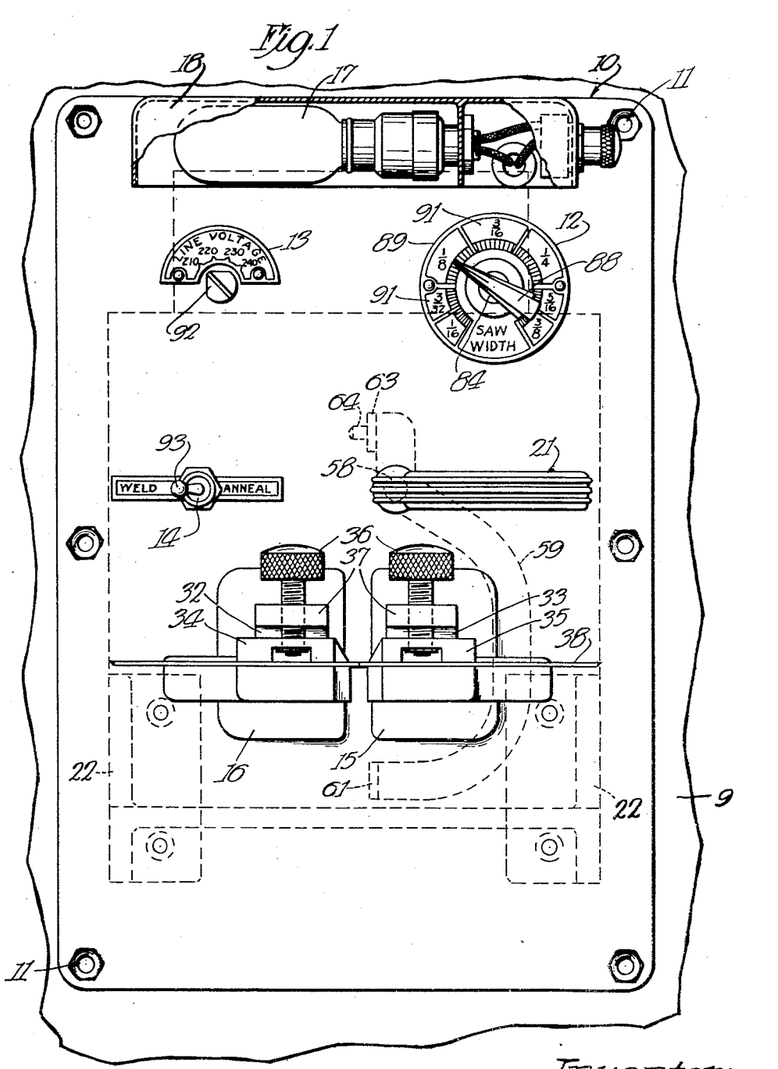
Fig. 1 is a side elevation of a combined sawing and filing machine, with parts broken away, and showing a panel attached thereto with the controls and the welding blocks in position thereon.

The terminal blocks 15 and 16 extend to the front of the panel and are provided with recesses 32 and 33 within which are slidably mounted the vertically movable clamping blocks 34 and 35, respectively, Fig. 1. These blocks are adapted to be raised and lowered by means of suitable screws 36 which extend through the slot in overhanging portions 37 of the terminal blocks. The lower ends of the screws are swivelled in the clamping blocks and are adapted to cause said blocks to clamp the ends of the saw blade or band 38 in position for welding or annealing the same, as shown more clearly in Fig. 1 of the drawings.

The stationary terminal block 15 is insulated from and rigidly mounted on the panel 10 and the movable block 16 is secured to the lower end of a depending arm 39, Fig. 3, which is pivoted on a shaft 41 journaled in a sleeve support 42 which in turn is rigidly attached to the panel 10, as by means of the bolts or screws 40. Attached to the movable block 16 at the lower end of the pivoted arm 39 and extending downwardly and laterally outwardly therefrom is an arm 43, Fig. 3, which has its lower end bent laterally, as shown at 44 in Figs. 6 and 7. This laterally extending end is screw threaded and has mounted therein a set screw 45 having a contact end 46 for engaging beneath a trigger member for controlling the movement of a mercury switch for opening the welding or annealing circuits, as will presently appear.

The arm 39 is adapted to oscillate between two set screws 47 and 48 adjustably mounted in the ends of a U-shaped member 49 rigidly mounted on the panel. Suitable means are provided for normally urging the arm 39, and with it the terminal block 16, toward the stationary terminal block 15. As shown, a spring 51 is employed for this purpose. A threaded stud 52 is adjustably connected to the arm 39 and the inner end of the stud 52 is connected by the spring 51 to a lever member 53. The lever member 53 is pivoted as at 54 to a stud connected with the panel and its upper end is provided with a contact plate 55 which in turn is adapted to be engaged by a cam 56 mounted on a shaft 57 which constitutes the rotating shaft of the rheostat 12. By means of this arrangement, the adjustment of the rheostat is made simultaneously with the adjustment of the tension of the spring 51. The parts are so constructed that when it is desired to weld saws of greater width, the electric current used in welding the parts may be changed and simultaneously with this adjustment, the tension of the spring 51 is increased so that there is a greater pressure between the ends of the saw band element than in welding narrower saws.

Suitable means are provided for controlling the duration of the welding period. In the form of the construction selected to illustrate one embodiment of the invention, mechanical means are employed for this purpose. The means are so constructed that a trigger mechanism is set simultaneously with the movement of the parts to normal position after release and after the automatic opening of the welding circuit and this trigger mechanism will move the mercury switch for automatically opening the welding circuit when the movable block 16 has reached a predetermined position, as will presently appear. Associated with this mechanism is a lever 21 extending to the front of the panel and which is rigidly mounted on a shaft 58 extending through and journaled in the panel and on which is rigidly mounted a rocking or switch operating arm 59, Fig. 3, the lower portion of which is C-shaped in form and has its extremity extending laterally as at 61, as shown in Fig. 2.

Attached to the laterally extending portion 61 is a spring 62, the opposite end of which is attached to a flange on the support 22. This spring rigidly mounted on the panel 10, see Fig. 3, holds the rocking arm in a normal open circuit position. The upper end of the arm 59 extends a short distance above the pivot 58 and has a laterally extending flange 63 in which is adjustably mounted a set screw 64, the outer end of which is adapted to adustably engage the arm 39, as shown more clearly in Fig. 3 of the drawings. This set screw 64 engages the swinging arm 39 for forcing the same against the adjustable set screw 48. The screws 47 and 48 limit the movement of the swinging arm in both directions and may be adjusted, as desired. The upper extension of the arm is adapted to engage a spring-pressed plunger switch member 60 of the usual or any well known type of plunger switch. Since the details of this switch constitute no part of the present invention, it is not thought necessary to illustrate and describe the details thereof. This switch is mounted on an L-shaped plate 65 rigidly connected to the panel 10 as shown in Fig. 3. It will thus be seen that when the lever 21 is forced downwardly, it will cause the upper end of the rocking arm 59 to move toward the left in Fig. 3 for forcing the plunger 60 of the switch inwardly to close the circuit through the welding mechanism and simultaneously releasing the swing arm 39.

Figure 6:
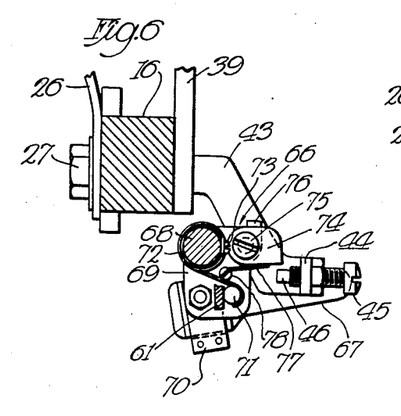
Fig. 6 is a fragmentary section taken on the line 6—6 of Fig. 2.
Figure 7:
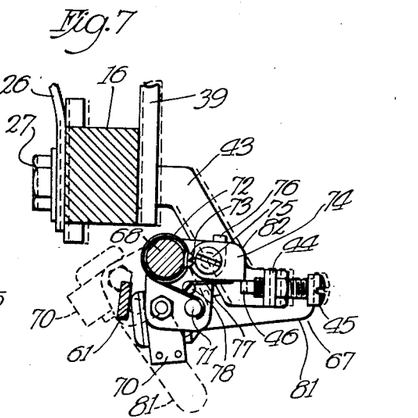
Fig. 7 is a similar view showing certain of the parts in a different position and certain parts in still another dotted line position.

The mechanism for automatically opening the circuit at the end of the welding period will now be described. This mechanism comprises the arm 43, Figs. 3, 6 and 7, which is carried by the movable block 16 and a trigger mechanism 66 which carries a mercury switch 67. The trigger mechanism 66 comprises a shaft or stud 68, Figs. 2, 6 and 7, extending rearwardly from the rear face of the panel 10 and rotatably mounted on the stud 68 is a plate 69 which is provided with a forwardly extending stud 71, Figs. 2 and 6, which is adapted to be engaged by one end of a spring 72 coiled about the shaft 68. The opposite end of the spring 72 is rigidly attached to the shaft 68, as by means of the screw 73. The spring is normally under tension so that it tends to move the plate 69 laterally toward the left in Fig. 6. A trigger 74 is rotatably mounted on a stud 75 which in turn is carried by the plate 69. A stop 76 on the upper edge of the plate 69, Fig. 2, is in the path of the trigger 74 and limits its upward movement. The trigger 74 is normally held in its uppermost position by means of a spring 77 having one end rigidly connected to the plate 69, as by means of the set screw 78, Figs. 6 and 7. The extension 46 on the set screw 45 in the arm 43 projects into the path of the trigger 74, as shown in Fig. 7 and prevents the plate 69 from rotating clockwise, as viewed in Figs. 6 and 7. Rigidly attached to the plate 69, as by means of a clip 70, is an elongated mercury tube or bulb which constitutes a mercury switch. This switch is of the usual mercury type which comprises a tube or bulb 81 having a pair of terminals 80, Fig. 8, in its inner end on the lower side thereof which is adapted to be covered by mercury and close the circuit when the bulb is in the position shown in Figs. 6 and 8 and in full lines in Fig. 7.

Suitable means are provided for tipping the mercury bulb for opening the switch when the welding operation is completed. As shown, the arm 43, Figs. 6 and 7, carrying the set screw 45 is adapted to move to the right in Fig. 7 during the welding operation, due to the softening or melting of the ends of the saw band and under the action of the tension of spring 51 on the arm 39 that carries the movable block 16. When the arm 43 has moved a sufficient distance for the projection 46 to clear the trigger 74, the plate 69 under the action of the spring 72, will rotate clockwise, as shown in Figs. 6 and 7, bringing the bulb 81 to the inclined dotted line position shown in Fig. 7 whereby the mercury will flow to the outer end of the tube or bulb and open the switch. The trigger mechanism is reset after the welding operation by releasing the lever 21 which will permit the swinging arm 39 to swing counterclockwise in Fig. 3 carrying with it the arm 43. The lateral extension 61, Fig. 2, of the swinging arm 59 will engage the pin or stud 71 carried by the plate 69, Figs. 2, 6 and 7, and move this plate counterclockwise, as viewed in Figs. 6 and 7, to the position shown in said figures. The trigger member 74 has the upper portion of its outer end rounded or curved, as at 82, which will engage the projection 46 as the plate 69 is rotated, and, being pivoted to said plate, will rotate clockwise against the tension of the spring 77 when the plate 69 is tilted counterclockwise by the member 61 as it moves toward the right in Fig. 7, thus permitting the trigger to pass the projection 46, Fig. 6, for resetting or positioning the mercury switch, as shown in Fig. 7.

Figure 4:
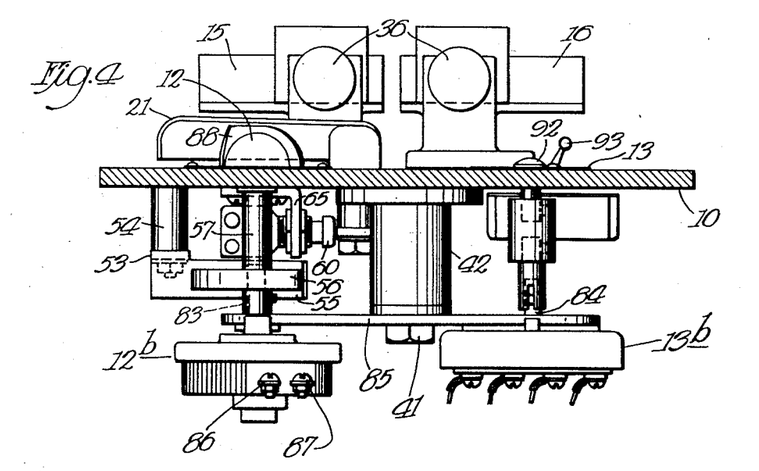
Fig. 4 is a section on the line 4—4 of Fig. 3.
Figure 5:
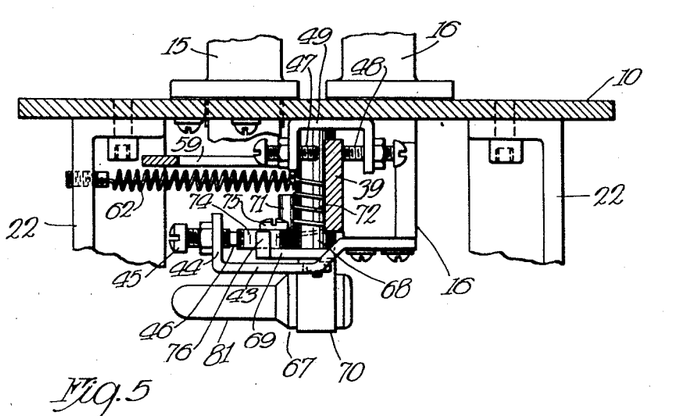
Fig. 5 is a section on the broken line 5—5 of Fig. 3.

The controls 12b, 13b and the switches 14 and 21 are so mounted that they may be operated from the front of the panel. The rheostat 12b and the tap switch or voltage control 13b have their shafts 83 and 84, respectively, passing through the panel 10 and have their rear ends journaled in a plate 85 which is rigidly connected to the shaft 41 on which the arm 38 is pivotally mounted. The rheostat 12b is the usual or any well known type having the binding posts 86 and 87, Fig. 4, for the electric conductor. The shaft 83 has an indicator 88, Fig. 1, which turns over an indicator plate 89 on which the thickness of the blade that is being welded may be indicated, as at 91. The tap switch 13b is also provided with an indicator 92 for indicating the line voltage. The switch 14 is also of any suitable or conventional type and is provided with a switch lever 93. The specific details of the tap switch, the rheostat and the switch 93 constitute no part of the present invention and it is not thought necessary to illustrate or describe the same further than to show the same diagrammatically on the drawings in Fig. 8.

Figure 8:
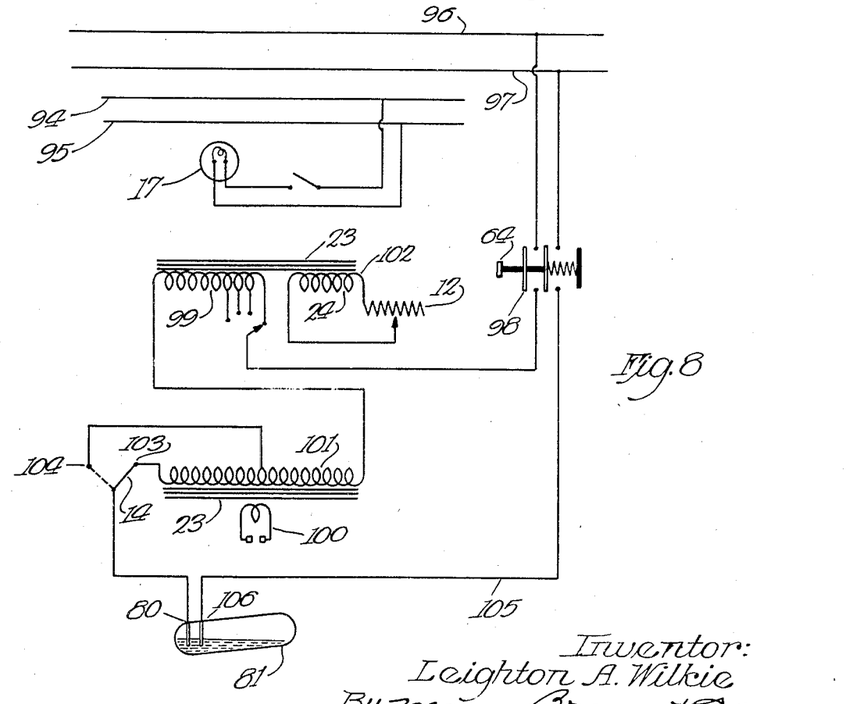
Fig. 8 is a wiring diagram of the welding device.

In Fig. 8 is shown a wiring diagram in which the lamp 17 is illustrated as being energized from the main line 94, 95, which may be the conventional 110 volt mains. As shown, the welding mechanism is connected with the line 96 and 97 which may be of a higher voltage than used by the lamp.

The switch 60 for closing the circuit through the welding mechanism and which is operated by the arm 39, see Figs. 3 and 8, is indicated diagrammatically at 98. The primary 99 to which the tap switch is connected is in series with the primary 101 of the main transformer. The rheostat 12 is connected with a secondary 102 for controlling the current passing through the primary coils 99 and 101. The secondary for the welding blocks is shown at 100 and the switch 14 is adapted to be connected with the terminal 103 for welding or with the terminal 104 for annealing. The return wire 105 passes through the mercury switch, as indicated at 106. When the mercury switch 81 is tipped to the position shown in dotted lines in Fig. 7, the mercury will uncover the terminals 80 and open the circuit.

In the operation of the device when it is desired to weld a saw band, the line voltage indicator 92 is moved to the corresponding position for the particular line voltage, the indicator 88 of the rheostat is moved to the point indicating the width of the saw to be welded, the switch 93 is moved to the welding position after which the arm 21 is depressed for releasing the swinging arm 39 and for closing the circuit by pushing inwardly on the switch plunger 60. The arm 21 is held down until the welding operation is completed. During the welding operation, the arm 39, which carries the movable terminal block 16 under the influence of the spring 51, will move to the left in Fig. 3 until the trip member 74 is released. Upon the release of the trip member 74, the mercury bulb 81, which is carried by the spring pressed plate 69, drops to the position shown in dotted lines in Fig. 7 and opens the switch. When it is desired to anneal, the switch 14 is moved to the annealing position shown in Fig. 3, that is, switch arm 14 is moved onto contact 103, Fig. 8, after which the lever 21 is depressed as above.

Figure 9:
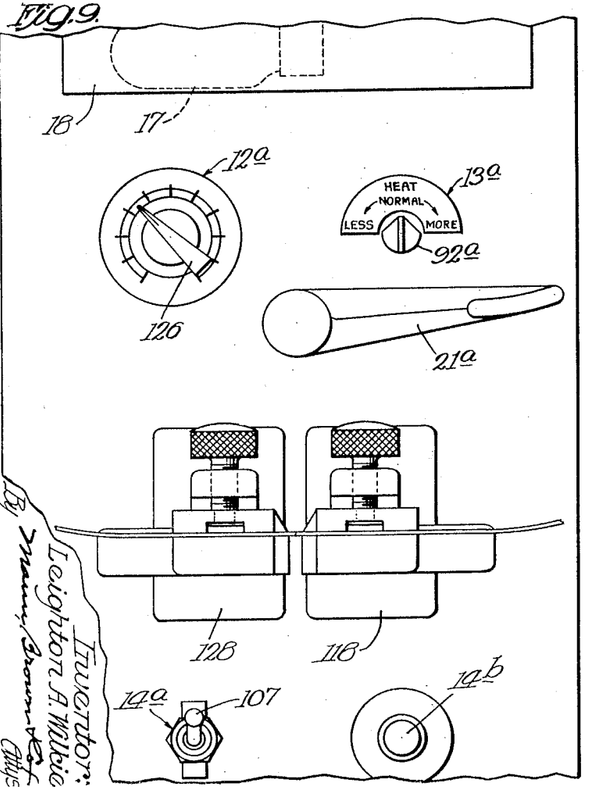
Fig. 9 is a front elevation of the preferred form of the welding device.
Figure 10:
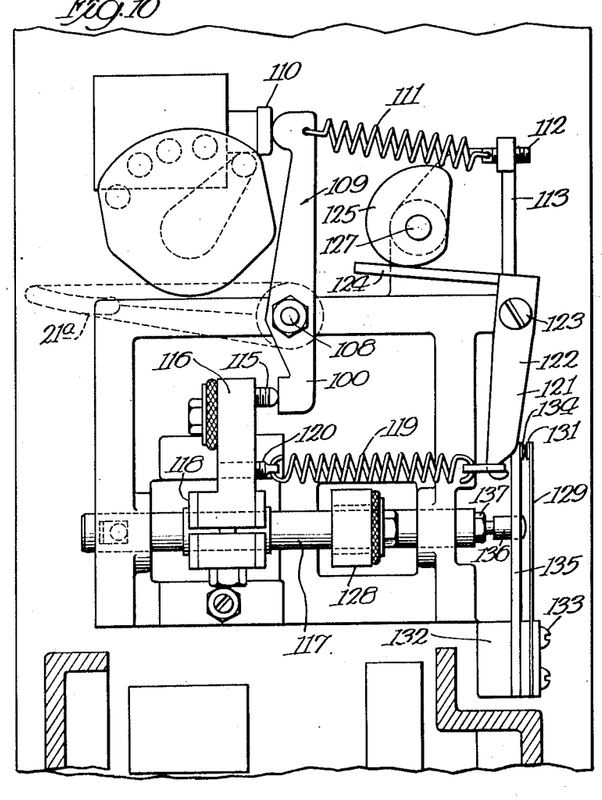
Fig. 10 is a vertical section of the construction looking toward the front of the panel and welding device.

The construction shown in Figs. 9 and 10 discloses a modified form of the welding apparatus. In this form of construction, the rheostat 12a, the switch 13a and lever 21a are substantially the same as in the previous construction, except that the rheostat 12a and tap switch 13a have been transferred to opposite sides of the panel. In this construction, a panel switch 107 is employed for closing the circuit through the lamp 17 which is provided with a reflector 18 as in the previous construction.

A spring-pressed button switch 14b of the door bell type is employed for the annealing circuit and corresponds to the switch 14 when it engages the terminal 103. This switch is of the spring-pressed type and automatically closes the circuit through the contact 103. In annealing, the button is pushed inward for closing the switch through contact 104. The switch is held depressed by the operator during the annealing operation.

The mechanism for automatically opening the circuit after the welding operation has been completed is greatly simplified in this construction. As shown, the lever 21a, which corresponds to the lever 21 in the previous construction, is mounted on a shaft 108 to which is rigidly connected the lever 109. The upper end of the lever 109 engages a spring-pressed plunger 110 when the lever 21a is depressed for closing the circuit through the welding blocks. The lever 109 is normally held by a spring 111 in an inoperative position, that is, a position for holding the movable welding block in inoperative position and simultaneously permitting the switch 110 to remain open as in the previous construction. One end of the spring 111 is connected to one end of the lever 109 and the other end is attached to a screw threaded plug 112 which is adjustably attached to a rigid member 113. The tension of the spring may be adjusted by the screw-threaded stud 112. The lower end of the lever 109 is adapted to engage a stud 115 adjustably mounted in an arm 116 which, in turn, is clamped onto a rod 117 and is insulated therefrom. The arm 116 is rigidly connected to a movable welding block 118 and is insulated from said block.

Suitable means are provided for normally urging the arm 116 and with it the movable block 118 toward the right in Fig. 10. As shown, a spring 119 is employed for this purpose. One end of the spring is attached to a stud 120 which is adjustably mounted in the arm 116 and its other end is attached to the lower end of an arm 121 of a bell crank 122 pivoted as at 123. The other arm 124 of the bell crank is adapted to be engaged by a cam 125 which corresponds to the cam 56 in the previous construction. This cam is adapted to be operated to adjust the tension on the spring 119. This is accomplished by turning the rheostat indicator 126 which is rigidly mounted on a shaft 127 to which the cam 125 is rigidly connected. As in the previous construction, the rheostat is so arranged that when the current is adjusted, the tension of the spring 119 and consequently, the pressure on the block 118 will be also adjusted simultaneously, as previously described.

This construction is provided with the movable block 118 and a stationary block 128, as previously described. Since these blocks are substantially the same as described above, it is not thought necessary to repeat the description of the clamping mechanism.

A suitable switch, such as a spring-pressed plate 129 having a terminal 131, is mounted on the base 132 by any suitable means, such as the screws 133 and is insulated therefrom in the usual manner. The contact 131 is adapted to engage a contact 134 carried by a rigid plate 135 connected to the base of the machine by the fastening means 133. The end of the rod 117 adjacent to the switch 129 is provided with a switch-actuating member 136 which is of any suitable non-conducting material and is adjustably connected to the end of the rod 117 as by being screw-threaded therein and held by a nut 137. The actuating member 136 extends through an opening in the plate 135, as shown in Fig. 10 of the drawings.

In the operation of the device, if it is desired to weld the severed ends of a saw together, the same are placed in clamps 128 and 118 so that the severed ends will be in contact with each other as in the previous construction.

Upon pressing the lever 21a downward, the lever 109 moves to the left in Fig. 10 to push the plunger switch 110 inwardly to close the circuit and in doing so, the lower end of the lever 109 releases the movable block so that under the influence of the spring 119 this block moves to the left as the severed ends of the saw are softened for effecting the weld until the actuating member 136 engages the spring-pressed plate 129 of the switch for opening the circuit through this switch. After the circuit is open, the lever 21a may be released and the spring 111 will move the upper end of the lever 109 to the right and its lower end to the left to move the movable welding block back to its normal inoperative position.

In Figs. 11 to 15 is shown a further modified form of saw band welding mechanism and grinder. In this form of construction, the welding mechanism 520, housed in the rear portion of the casing 8 and mounted on the removable plate 12c, is provided. This mechanism has a fixed terminal 530 and a movable terminal 540, Fig. 12, extending to the exterior of the casing. These terminals are each provided with clamping members 550 for clamping the ends of the band fixedly to the terminals 530 and 540. These clamping members may be of any suitable form, but as shown on the drawings, the terminals 530 and 540 are provided at their outer ends with slots 560, Fig. 12, in which is movably mounted a clamping block 570 which is adapted to be forced downwardly against the ends of the band for clamping the same against the lower marginal surface of the slot. Suitable screws 580, swiveled at their lower ends in the blocks 570, are provided for this purpose. The terminals have inwardly extending projections 53a and 54a, Fig. 14, adjacent the inner ends of the slots for shortening the gap between the terminals at that point whereas the outer ends of the terminals are much farther apart. The former is desirable for welding and the latter for annealing, as will presently appear.

Figures 11, 12:
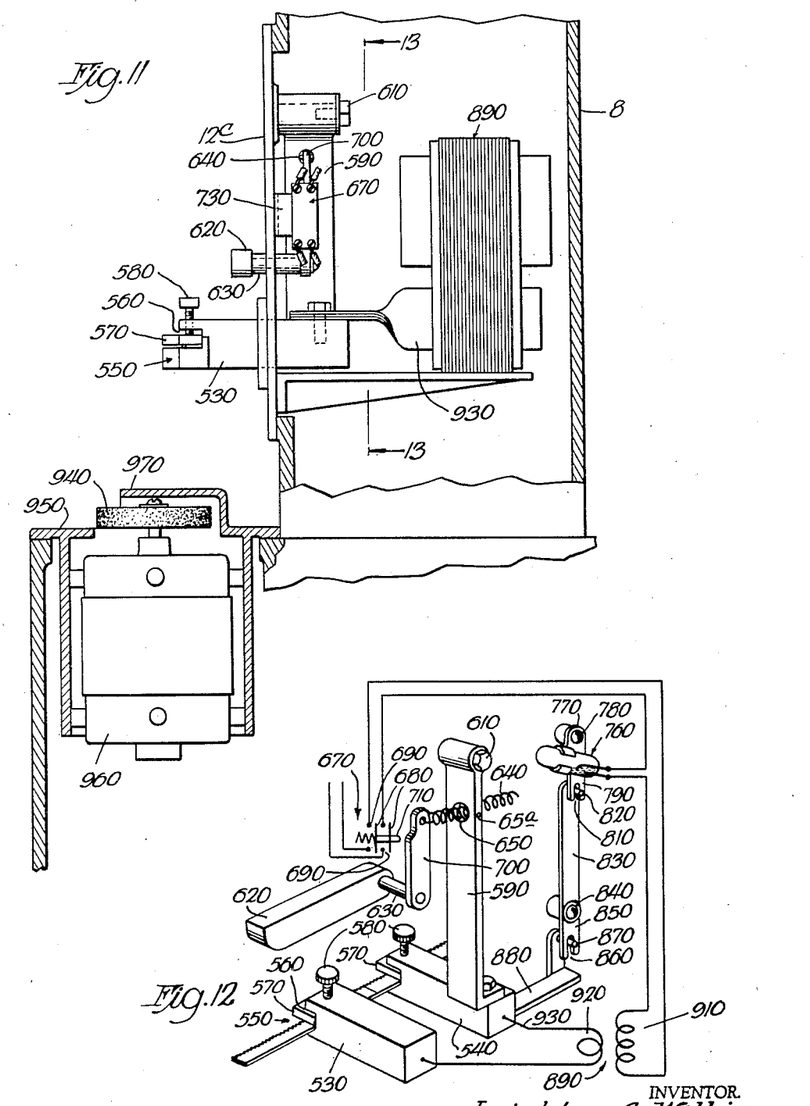
Fig. 11 is a vertical section of the machine, with parts broken away, showing the welding and grinding mechanism.
Fig. 12 is a diagrammatic view showing the welding mechanism.

The movable terminal 540 is rigidly connected to a swinging arm 590, Fig. 12, which is pivoted as at 610 to the plate 12c, Fig. 11. A spring 640 normally holds the movable terminal 540 out of contact with the stationary terminal 530. While in use, the movable terminal is held inwardly by a control lever 620. The lever 620 is rigidly connected to a shaft 630 extending through and pivoted in the closure plate 12c. An arm 700, rigidly secured to the shaft 630 and connected to the inner end of the spring 640, is adapted to be moved forwardly by the handle 620 for moving the arm 590 forwardly, and with it, the terminal 540, as will presently appear.

Figure 13:
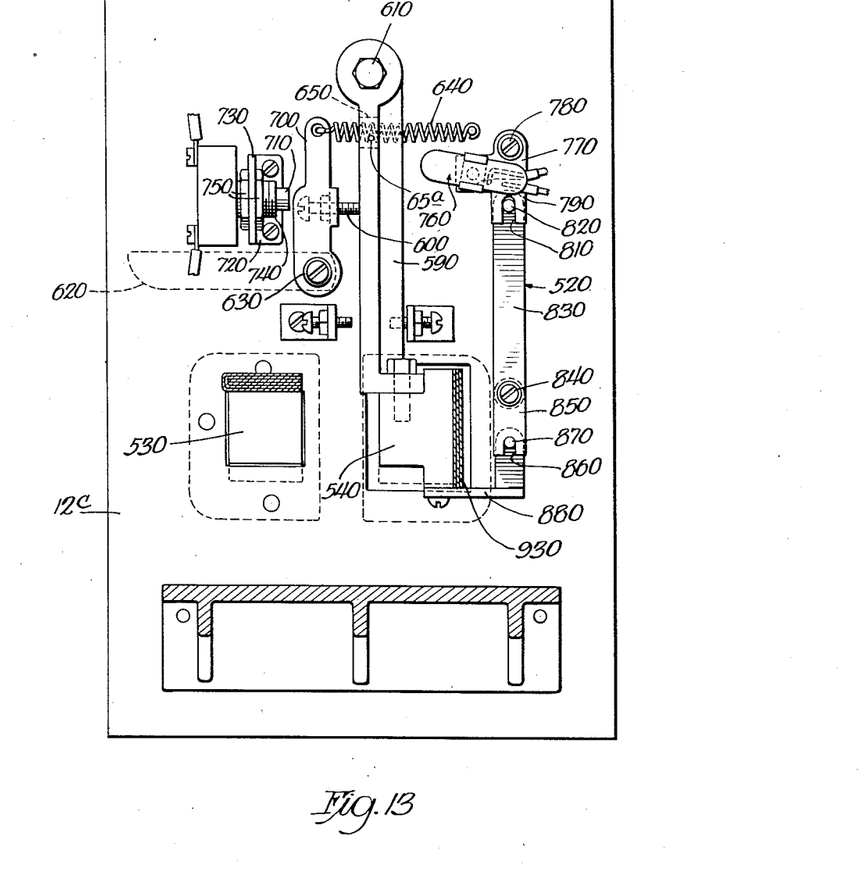
Fig. 13 is a section on the line 13—13 of Fig. 11.
Figure 14:
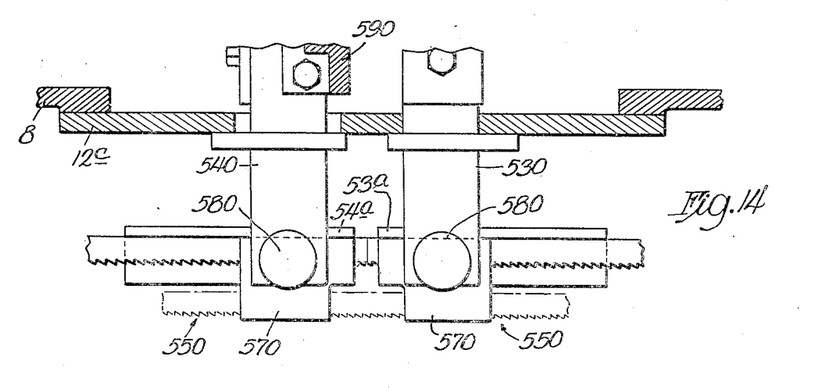
Fig. 14 is a top plan view of the holding members for the welding mechanism, with parts broken away.
Figure 15:
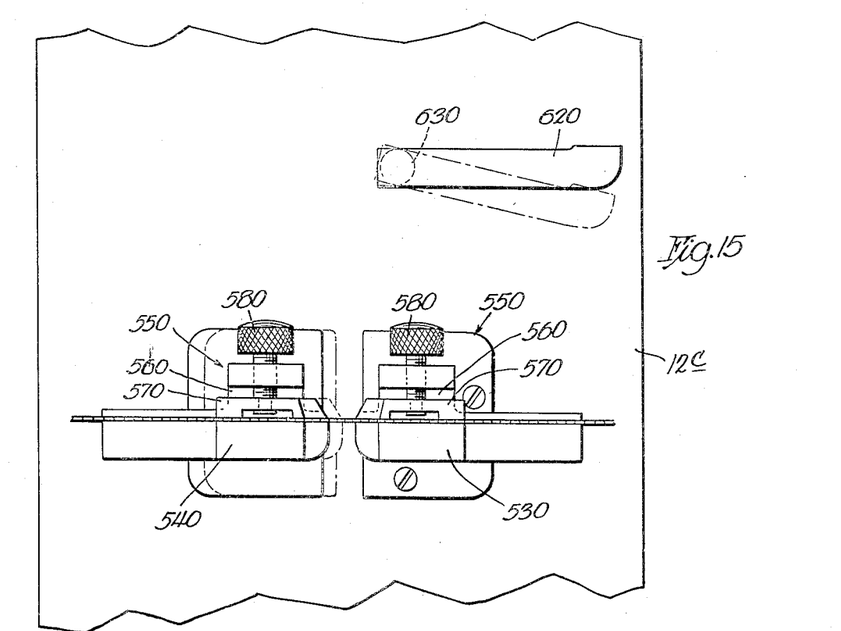
Fig. 15 is a side elevation of a portion of the machine, with parts broken away, but showing the holding mechanism and control lever for the welding device on an enlarged scale.

The arm 700 is preferably provided with an adjustable contact screw 600 which engages the arm 590 as clearly shown in Fig. 13 of the drawings. This screw is adapted to be adjusted to the desired length for causing the proper movement of the arm 590 when engaged by the screw 600 upon the release of the lever 620. The arm 700 is held rearwardly by the spring 640 which, in the construction shown, extends through an enlarged opening 650 in the terminal supporting arm 590. A pin 65a extending transversely through the spring 640 serves to connect each end portion to the arm 590. The lever 620 is located outwardly of the plate 12c, Figs. 12 and 13, and constitutes a means for moving the terminal 540 for causing it to swing inward to bring the ends of the band into contact, as will presently appear.

It is desirable that the parts be so arranged that when the lever 620 is depressed, it will operate a switch for closing the welding circuit through the abutting ends of the band. Means are also provided for automatically opening a switch in the welding circuit when the welding operation is complete. In the form of the construction shown, Figs. 12 and 13, the switch 670 is closed by the arm 700 which will force the movable elements 680 of the switch against the fixed contacts 690 when the lever 620 is pressed downward. In practice, the arm 700 is adapted to engage a spring pressed button 710, Fig. 13, for closing the switch when it is depressed and to open the switch when it is released.

The switch 670 is adjustably secured in position on the wall closure plate 12c by any suitable means. As shown, a bracket 720, Fig. 13, having an outstanding flange 730 is secured to the wall of the closure plate 12c. The flange 730 is provided with an opening through which a threaded stem 740, secured to the switch 670, extends. This stem is adjustably mounted by means of the nuts 750 on the stem 740 at each side of the flange 730. By means of these nuts, the position of the button 710 may be brought nearer or farther from the arm 700.

Any suitable mechanism is provided for automatically opening a switch in the primary of the welding circuit when the welding operation is completed. In the form of the device shown in Figs. 12 and 13, a mercury switch 760 is employed for this purpose. The switch 760 has an upstanding arm 770 pivoted as at 780 to the closure plate 12c and has a lower extending arm 790 provided with a slot 810 which is adapted to be engaged by a pin 820 on the upper end of a swinging arm 830, pivoted at its lower end as at 840. The arm 830 has an extension 850 which is slotted as at 860 for engaging the pin 870 on an arm 880 carried by the movable terminal. The parts are so proportioned that when the movable terminal 540 is moved inward by the lever 620, the inward swinging of the arm 590 will cause the arm 830 to move about the pivot 840 and this in turn will tilt the mercury bulb switch 760 and open the circuit which is normally closed when the device is not in operation.

A suitable transformer 890, Figs. 11 and 12, having a primary winding 910 having the switches 670 and 760 therein and a secondary winding 920 connected with the terminals 530 and 540 are employed for furnishing the current for performing the welding operation. Since the details of the transformer and the wiring arrangement constitute no part of the present invention, it is not thought necessary to illustrate and describe the same more in detail other than to state that the lead 930 of the secondary winding 920 that is connected with the movable terminal 540 is preferably flat, as shown in Fig. 11, so as to provide sufficient flexibility to permit the proper movement of the terminal block 540.

In the operation of the device, the two ends of the band to be welded are inserted in the inner ends of the slots beneath the projections 53a and 54a and are clamped in position in end to end alinement, the lever 620 is depressed for forcing the lever 590 inward for closing the switch 690 and held in lowered position whereby the tension of the spring 640 will cause the ends of the band to be yieldingly forced against each other. As the abutting ends of the saw are softened, the pressure will cause them to shorten due to the swedging of the heated ends. The tension of the spring 640 will cause said block to move farther and farther inward until it tilts the mercury switch 760 sufficient to open the circuit. The lever 620 is then released and the set screws 580 unscrewed, which will permit the arm 590 to be retracted by the spring 640. The band is now welded but is very hard. In order to temper the weld, the band is slid forward to the outer ends of the slots as shown in dotted lines in Fig. 14 and again clamped in position after which the lever 620 is depressed for an instant until the weld becomes blue in color and is then released. This reheating for an instant to a blue color anneals the welded portion.

After the welding operation, it is necessary to remove the flash or enlargements at the weld. The welding operation causes a thickening of the band and this thickened portion must be reduced before the band can be used. Suitable means are provided for grinding the band to the proper dimensions. As shown, a grinder 940 is mounted on the ledge 950 and operates about a horizontal axis. The grinder may be mounted on the armature shaft of the motor 960 which operates the grinder. A shield 970 is preferably provided for the grinder 940.

It is thought from the foregoing, taken in connection with the accompanying drawings, that the construction and operation of my device will be apparent to those skilled in the art and that changes in size, shape, proportion and details may be made without departing from the spirit and scope of the appended claims.

I claim as my invention:

1. A welding and tempering apparatus for use on a band sawing machine comprising a pair of terminal blocks, means for movably mounting one of said blocks, means carried by said blocks for holding the ends of a severed band saw in aligning contact, means for supplying pressures to the contacting ends of the saw band, means for causing a welding circuit to pass through said saw ends, means for automatically opening said circuit at the end of the welding operation, and means including a shaft, a rheostat and a cam rotatable with said shaft for simultaneously varying the welding current and changing the pressure on the contacting ends of the saw band.

2. In a welding machine, a frame, a pair of terminals carried by said frame, means for movably supporting one of said terminals on said frame, means carried by said terminals for holding members to be welded together in abutting relation, means for applying a continuous pressure to cause one of said terminals to move toward the other, means including a rheostat and a cam for varying the welding current and said pressure simultaneously, and means for automatically opening said circuit at the end of the welding operation.

3. In a welding apparatus, a pair of welding terminal blocks, one of which is movable to and from the other, means on said blocks for gripping the severed ends of a saw band, a swinging lever, a spring urging said lever in one direction, a handle for moving said lever in the opposite direction, a switch operated by said lever for closing a circuit through said blocks and saw ends, a trigger mechanism including a tilttable mercury switch element for opening said circuit, spring means tending to tilt said element for opening said circuit, a trigger member, and means on said movable block for holding said trigger member against the tension of said last-named spring, said trigger element being released when said movable block moves through a predetermined distance for opening said circuit.

4. In a welding device for a metal cutting tool comprising a movable terminal, a fixed terminal, said terminals having alined slots therein for receiving the ends of a metal cutting band, clamping means for holding said ends in said slots, a pivoted arm for supporting said movable terminal, spring means for normally holding said arm in retracted position, a hand lever for moving said arm to operative position, a resilient connection between said lever and arm, and a switch operated by said arm for closing a circuit through said terminals and ends for welding said ends together.

5. In a welding device for a metal cutting tool comprising a movable terminal, a fixed terminal, said terminals having alined slots therein for receiving the ends of a metal cutting band, clamping means for holding said ends in said slots, a pivoted arm for supporting said movable terminal, spring means for normally holding said arm in retracted position, a hand lever for moving said arm to operative position, a resilient connection between said lever and arm, a switch operated by said arm for closing a circuit through said terminals and ends for welding said ends together, and means for opening said circuit when said arm is moved by said lever to a predetermined position.

6. In a device for welding two ends of a saw band, means for holding the ends of said band in alinement, means for simultaneously bringing the ends of said band into abutting engagement and for closing an electric circuit through said ends for welding the same, means for automatically opening said circuit after the welding operation, means for applying continuous pressure for yieldingly forcing the abutting ends of said band together and means for varying said pressure, and means including mechanism adjustable simultaneously with the adjustment of said last-named means for varying the welding current.

7. A welding and tempering apparatus for use on a band sawing machine comprising a pair of terminal blocks, means for movably mounting one of said blocks, means carried by said blocks for holding the ends of a severed band saw in aligning contact, means for applying pressure to the contacting ends, manually operated means for closing a welding circuit through the saw ends, a rheostat for varying the current, means controlled by the operation of the rheostat for varying the pressure applied to the contacting ends of said band, and means for opening said circuit when one of said blocks has moved through a predetermined distance.

8. In a welding apparatus for use in welding band saws, a pair of terminal blocks for a welding current, means for slidably mounting one of said blocks for movement to and from the other block, means on said blocks for clamping the ends of a severed band saw in alinement and in abutting relation, adjustable means for urging the movable block toward the other block, a switch, means for varying said current simultaneously with the adjustment of said last-named means, and means including said switch for closing the welding circuit through said blocks and saw band ends for welding the same.

9. In an apparatus for butt welding the ends of severed saw bands and the like, comprising a pair of terminal blocks for a welding electric circuit, a spring for moving one of said blocks toward the other, a spring tensioned lever for normally holding said blocks apart, a switch for closing a welding circuit through said blocks, means for operating said lever for releasing the movable block and for simultaneously closing the welding circuit through said band ends for welding the same, and means including a plurality of levers for simultaneously varying the welding current and for changing the tension of said first-named spring.

LEIGHTON A. WILKIE.